United States Patent

Nasu

Patent Number: 5,572,642
Date of Patent: Nov. 5, 1996

[54] DATA INPUT DISPLAY SYSTEM FOR PREPARING AND EDITING STRUCTURAL DATA

[75] Inventor: Michiro Nasu, Fukaya, Japan

[73] Assignee: Baba Laboratory Inc., Saitama-ken, Japan

[21] Appl. No.: 237,108

[22] Filed: May 3, 1994

Related U.S. Application Data

[63] Continuation-in-part of Ser. No. 701,239, May 16, 1991, abandoned.

[51] Int. Cl.⁶ ........................................ G06T 1/00
[52] U.S. Cl. .................................................. 395/118
[58] Field of Search ........................... 395/144–148, 395/161; 364/735, 705.1; 345/23, 25–27, 117

[56] References Cited

U.S. PATENT DOCUMENTS

| | | |
|---|---|---|
| 4,679,153 | 7/1987 | Robinson et al. ............ 364/523 |
| 5,020,122 | 5/1991 | Walsh et al. ............... 382/56 |
| 5,146,553 | 9/1992 | Noguchi et al. ............ 395/146 |
| 5,150,458 | 9/1992 | Masuzaki et al. .......... 395/135 |
| 5,189,633 | 2/1993 | Bonadio ................. 364/709.12 |
| 5,189,731 | 2/1993 | Sakamoto et al. ......... 395/146 |

Primary Examiner—Heather R. Herndon
Assistant Examiner—Joseph H. Feild
Attorney, Agent, or Firm—Nikaido, Marmelstein, Murray & Oram LLP

[57] ABSTRACT

A data input display system makes it possible to input data which have a document structure having constraint in disposition of constituent elements. Such a structure is used in mathematical formulae, chemical formulae, and other data which have grammar and notations. The data input display system allows this type of data to be entered with a same level of ease and simplicity as the input of ordinary characters, and can ensure correct display and synthetic correctness of an input document; the system automatically configures the data on the display screen, based upon an integrated input, construction, and configuration process.

2 Claims, 6 Drawing Sheets

| 601 | LIST HEAD | ⊢ |
| 602 | NONTERMINAL BLOCK | ○ |
| 603 | INPUT FIELD | □ |
| 604 | GRAPHIC ELEMENT | △ |
| 605 | FIRST PROPAGATION PATH | ⇐ |
| 606 | VISIBLE ENVELOPE | --- |

DATA INPUT DISPLAY SYSTEM FOR PREPARING AND EDITING STRUCTURAL DATA

This application is a continuation-in-part of application Ser. No. 07/701,239 filed May 16, 1991, abandoned.

BACKGROUND OF THE INVENTION

1. Field of the Invention

This invention relates to a data input display system, and more particularly to a data input display system for preparing and editing structural data having layout format constraint of constituent elements, such as mathematical formulae, chemical formulae, programming flow charts, project planning diagrams, Sequential Function charts, and other data of structure directed editors.

2. Description of the Prior Art

Structural data such as graphical positioned content of mathematical formulae has layout format constraints of its notations, for example, a fraction is composed of a denominator, a numerator and a straight line separating the fraction into two parts; the center of the denominator has to coincide with the center of the numerator; the length of the line must be equal with the longer part of the fraction; and so forth.

A conventional data input display system of this kind uses a character output device as display means, and designates character sizes and their positions by inserting instruction codes modifying inputted character strings to conform character positions to these constraints and displays them on a display screen. Therefore, complicated and troublesome procedures are necessary for inputting the instruction codes and modifying character strings. Since an input might possibly cause a syntactic error, overlap of characters occurs on the screen. Moreover, additional syntatic interpretation or reconstruction means makes the operations of the data input display system more complicated. Since the inputted characters are typically scanned on the screen as a whole and displayed again in order to decide the placement on the screen, the full screen is rewritten whenever one character is inputted; this can cause a problem of degradation of display quality. Since conventional systems are not equipped to distinguish a block area on the screen, it is not possible to assist a user with such operations as revising and updating data having format constraint within a block area.

SUMMARY OF THE INVENTION:

It is therefore an object of the present invention to solve the problems with the prior art and technology described above and to provide a data input display system which can assist a user in an interface capable of inputting structural data having layout format constraint of constituent elements of, for example, mathematical formulae and chemical formulae with the same level of ease as the input of ordinary characters.

In a data input display system for displaying text, symbols, and graphic data on a display screen and for preparing and editing data having a document structure having layout format constraint of constituent elements of mathematical formulas and chemical formulas, a data input display system in accordance with the present invention comprises input means for inputting a character, a digit, a symbol, an instruction code and serial strings or sequences of said codes. Construction means are provided for analyzing sequentially inputted codes and generating, deleting and memorizing the data in editorial tree structured data form holding layout information in each node. Configuration means are provided for calculating the relative positions on the screen regarding said layout information to conform to the layout format constraint of the editorial tree data elements composed by the construction means, and for storing the result. Display means are provided for reading out the data stored by the configuration means, and selecting and displaying only those graphic elements whose contents and placement on the screen are changed. Output means are provided for converting to serial code strings the tree data stored by both of the construction and configuration means, and either outputting the final result or storing it.

DETAILED DESCRIPTION OF THE PREFERRED EMBODIMENTS

Data such as a mathematical formula can be expressed by three kinds of data forms, i.e. an output data form, an exchange data form and an editorial data form, inside a system. Here, the term "output data form" represents a data form wherein a user obtains a final output typically such as a display output or a print output. This is a data form in which logical structure of the original data is lost and it is generally impossible to reproduce the original data as one and same thing. The exchange data form is a data form for transmitting data to storage devices or exchanging data between different systems, and this data is expressed generally as code strings. This is a data form which can preserve logical consistency of the original data and can be arranged or configured later. Input data from a keyboard or the like are converted to this form and handed over sequentially at the time of input and edit. The term "editorial data form" requires a data form which has both characteristics of the output data form and the exchange data form, and this data structure is capable of preserving logical consistency of the data, and also storing and updating the information for display placement.

In the following description, such data structure of an editorial data form as described above will be referred to as an "editorial tree", which is a multi-way or branched tree structure format holding layout information in each node, and has at least one active node to accept code input.

The function of the data input display system of the present invention relating to the data forms described above will be set forth below. First of all, when a serial code string of sequences of characters, digits and symbols is inputted by the input means described above, the input means outputs the data inputted as data of an exchange data form to the construction means. The construction means analyzes the codes inputted from the input means, and generates, deletes and memorizes the data in an editorial tree holding layout information in each node. Next, the configuration means calculates the relative positions regarding said layout information to conform to the layout format constraint which calculation propogates to an area of all the leaves of the editorial tree composed by the construction means, and determines the configuration on the display screen, then the configuration means stores the result of the calculation. Next, the display means reads out the editorial tree stored by the configuration means, selects only those graphic elements whose contents and placement on the screen are changed, and displays them. Furthermore, the output means converts the editorial tree stored by both construction and configuration means, and either outputs the final result or stores it. In other words, the system of the present invention can be said to be a data input display system which accepts the data of the exchange data form by the input means, converts the data to the editorial tree data form by both of construction and configuration means described above, feeds back the data to a user by said display means during input and edit work, and by the output means converts the data to the output data form or to the exchange data form and then outputs the data.

Hereinafter, an embodiment of a data input display system according to the present invention will be explained with reference to the accompanying drawings.

Figure 1:
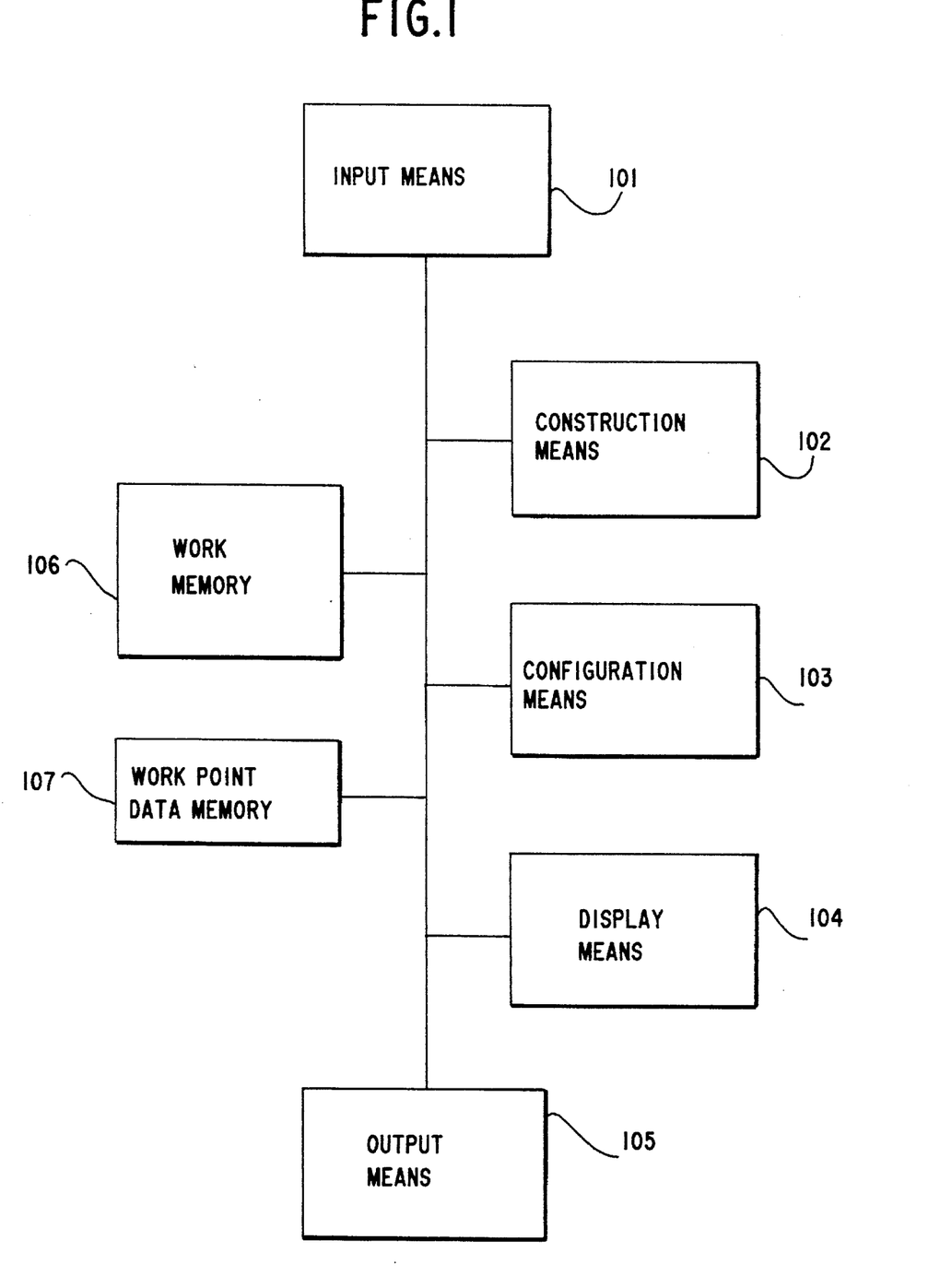
FIG. 1 is a schematic block diagram showing an embodiment of a data input display system in accordance with the present invent ion.

FIG. 1 is a schematic block diagram showing the structure of the present invention which includes input means 101, construction means 102, configuration means 103, display means 104, output means 105, a work memory 106 and a work point data memory 107. The input means 101 outputs the data inputted from outside as data of an exchange data form to the construction means 102. There are various methods to input specific symbols, for example, such as a method allocating function keys on a keyboard to each symbols, a method selecting a symbol from a menu on the screen with pointing device such as a mouse, a method inputting a symbol registered in a dictionary through kanji conversion interface, and so forth. In addition to characters, digits, and symbols, the codes outputted by the input means include instruction codes for designating the movement of the work point such as backspace, deletion, move right, move left, etc.

The work point data memory 107 is provided for storing therein the current work position for the editorial tree. The construction means 102 analyzes sequentially inputted codes, generates, deletes and memorizes the data as an editorial tree holding layout information in each node in the work memory 106 by referring to the work point data memory 107 and updates the content of the work point data memory 107.

Figure 2:
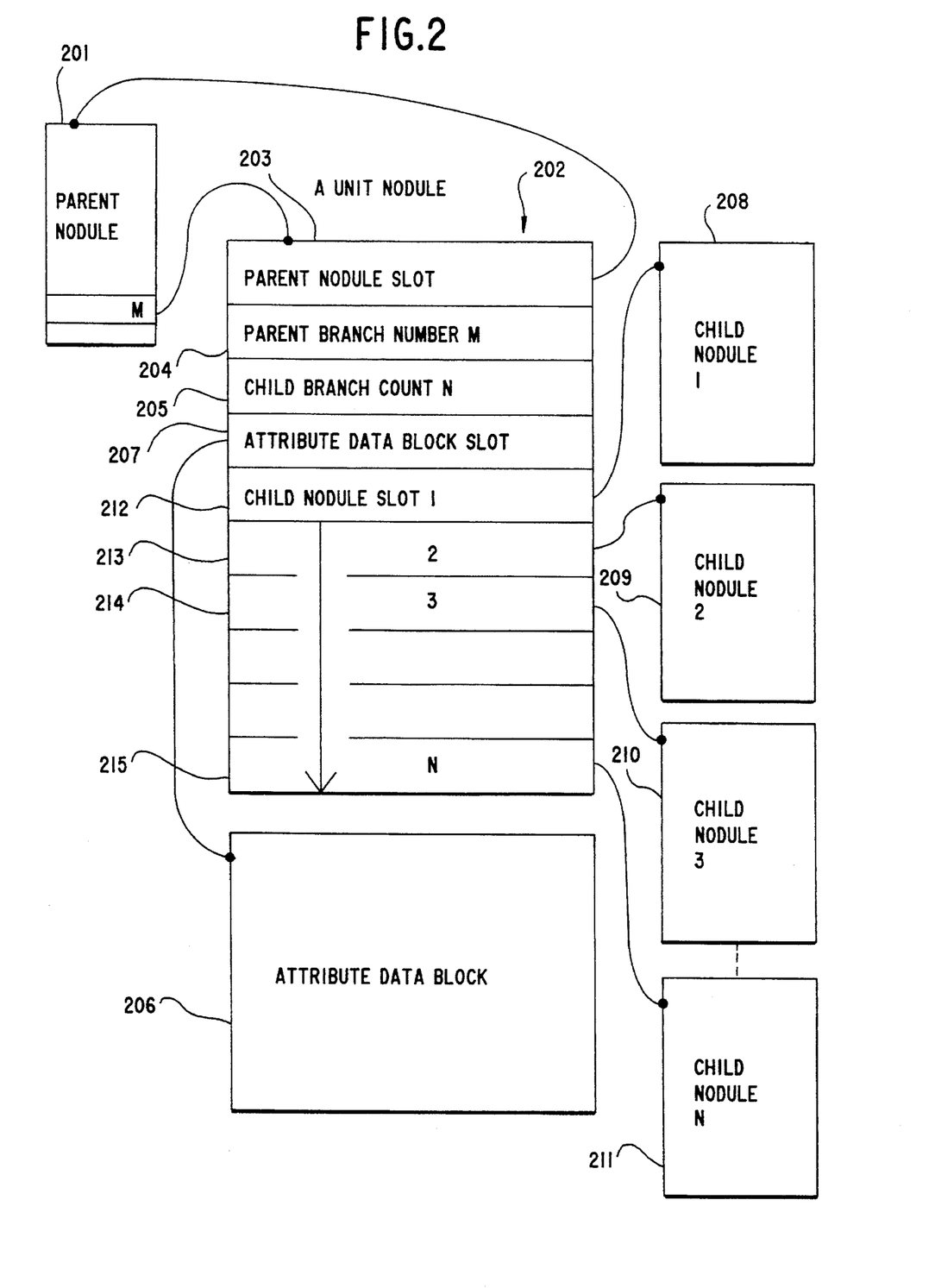
FIG. 2 is a structural view of a nodule.

FIG. 2 shows a unit nodule with which any multi-way tree structure may be able to be constructed with enhanced efficiency of processing. In the following description, those data with tree structured data form organized by nodules will be referred to as a "nodule list" which can represent an editorial tree. Each field of the nodule is used for any of the following applications. In FIG. 2, a parent nodule 201 links to a unit nodule 202 and in succession to a parent nodule slot 203 for storing a pointer to the parent nodule, a parent branch number slot 204 for storing the numerical order of the child nodule slot of the parent nodule, a child branch count slot 205 for storing counts of child nodule slots, an attribute data block slot 207 for storing a pointer to attribute data block 206 of the nodule and child nodule slots 212–215 storing pointers to child nodules 208–211. The attribute block stores information concerning an inherent quality or character of the nodule.

Since the construction means 102 described above is provided with some auxiliary means for operating nodules such as shown in the table below, it is possible to operate any nodule list of multi-way tree generally and irrespectively of its contents.

TABLE

| Auxiliary means of nodule operations | |
| --- | --- |
| Auxiliary means | Function |
| Generation of Nodule | A new nodule having child slots in designated number is generated and connected to the designated parent nodule on the child slot designated by the parent branch number. If any initial data exists, it is transferred to the attribute data block of the new nodule. The previously resident nodule on the child slot of the parent nodule is connected to the first slot of the new nodule. |
| Deletion of Nodule | A designated nodule is deleted from the nodule list. |
| Release of Nodule | A designated nodule and its child nodules are all deleted from the nodule list. |
| Retrieval in Postorder | If the parent nodule has a branch which is lower than the designated nodule and not on the first slot then backtrack upward from the branch, or else return to the parent nodule. |
| Retrieval in Preorder | If there exists a child nodule on or after the second slot then return to the lowest branch, or else if a child nodule on the first slot exists then return to the first slot nodule, or else backtrack downward. |
| Backtracking Upward | Turn back to leaf direction and return to the highest order nodule. |
| Backtracking Downward | Turn back to root direction and return to the higher order nodule. |

Supposing that the layout format constraint is a plain geometrical relation among a symbol block and its local components, hereinafter "layout format constraint" will be assumed at most in the second degree of relationship and any long-distant dependency will be disregarded.

The relationship making up a fraction is a closed local relation (fraction, denominator, numerator, straight line) and this relation is composed of a lot of sub-relations such as (fraction, denominator), (denominator, numerator), (denominator, numerator, straight line) and so forth. Indeed, this local relation is composed of several complex relations but it can be reduced into simple parent-child relative placement as below. A fraction node is a parent of both a node of the denominator and a node of the numerator in the editorial tree as it is a chief member of the closed local relation described above. The layout format constraint between the denominator and the numerator can be coordinated to relative placements of the parent fraction node, and these relative placements are mapped into the coordinates of the fraction. There might be 8 sub-relations in the closed local relation but they can be reduced into only 3 mappings of the parent-child relative placements. Moreover, through these parent-child relative placements, disposition of the constituent elements in the display screen can be determined by traversing the editorial tree in preorder from the root and shifting their relative positions simply and automatically in parallel motions.

Any nodule has a similar composition and the particular data of some individual nodules are stored in an attribute data block to which the nodule links with the pointer stored in the attribute data block slot of the nodule.

Figures 3A, 3B:
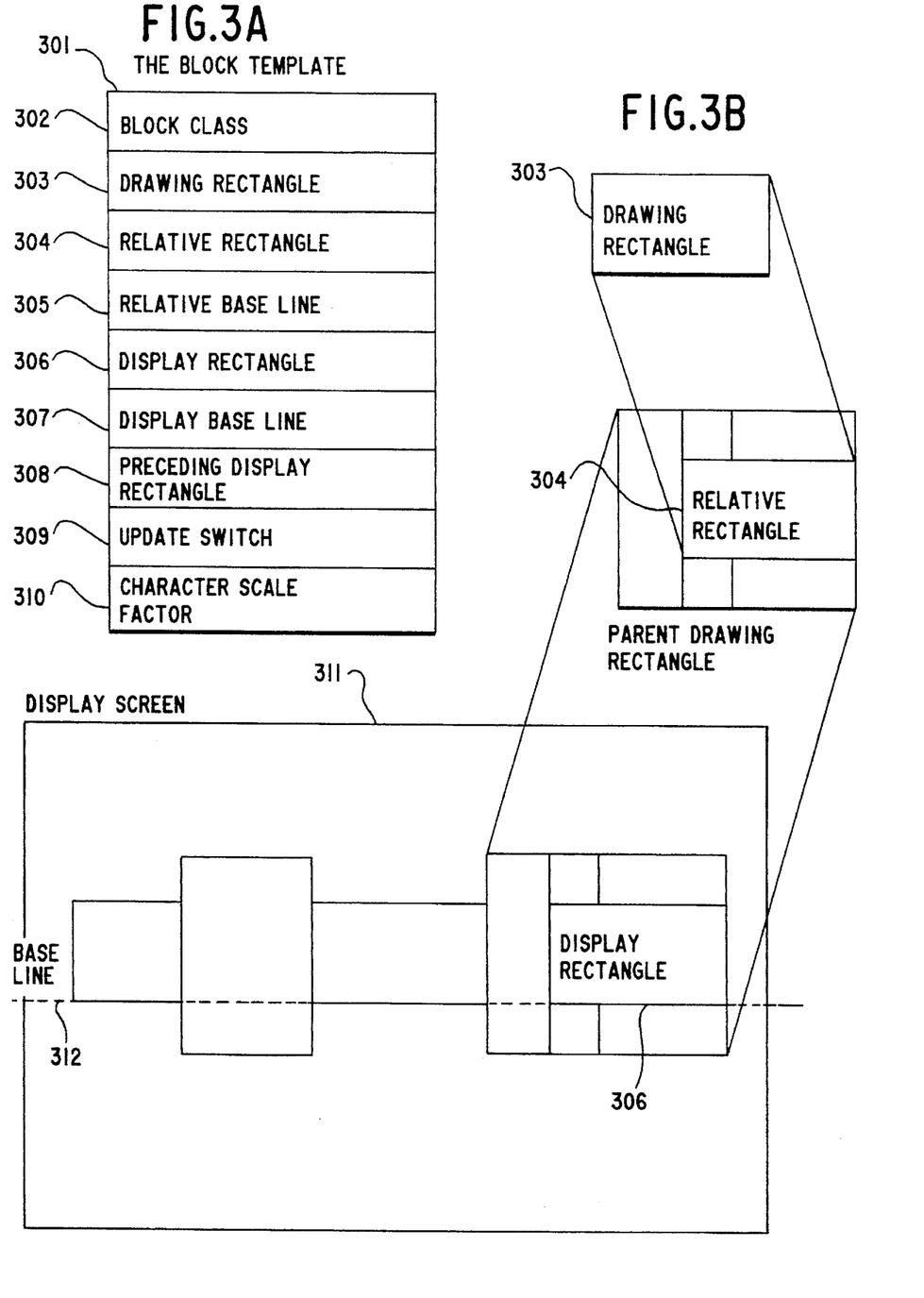
FIG. 3A is a structural view of a block.
FIG. 3B is an explanatory view showing the relation of each graphic rectangle.

FIG. 3 shows an example template of an attribute data block for mathematical formula. In the following description, the data having this structure will be referred to as a "block", and occasionally a block will also represent a nodule including the block, if it would not make the representation misleading. Each field of this block is used for the following applications. The base line described hereinafter will be used to represent a horizontal line for designating a vertical position where a character is displayed.

In FIG. 3A, there is shown a block 301 including fields such as a block class 302 for storing the class identifier of the block 301, a drawing rectangle 303 representing the minimum rectangular area for drawing the block 301, and a relative rectangle 304 for representing a relative position when the block is disposed in the drawing rectangle of the parent block. A relative base line 305 is provided for representing the offset of the base line when the block is disposed in the drawing rectangle of the parent block. Display rectangle 306 represents the absolute position when the block is disposed in a display area of the screen. Display base line 307 represents the absolute position of the base line when the block is disposed in the display area of the screen, and preceding display rectangle 308 is for saving the copy of the display rectangle when the display of the block is updated on the screen, and for judging whether the absolute position of the block is changed or not. Update switch 309 is turned ON when the content of the block is updated or when the absolute position of the block is changed whereby the display means displays again only the block whose update switch is turned ON, and character scale factor 310 is for storing the scaling factor of characters used in the block.

FIG. 3B is a schematic view showing the relationship of placement between the drawing rectangle 303, the relative rectangle 304 and the display rectangle 306. Reference numeral 311 represents the display screen and reference numeral 312 represents the base line.

Figure 4:
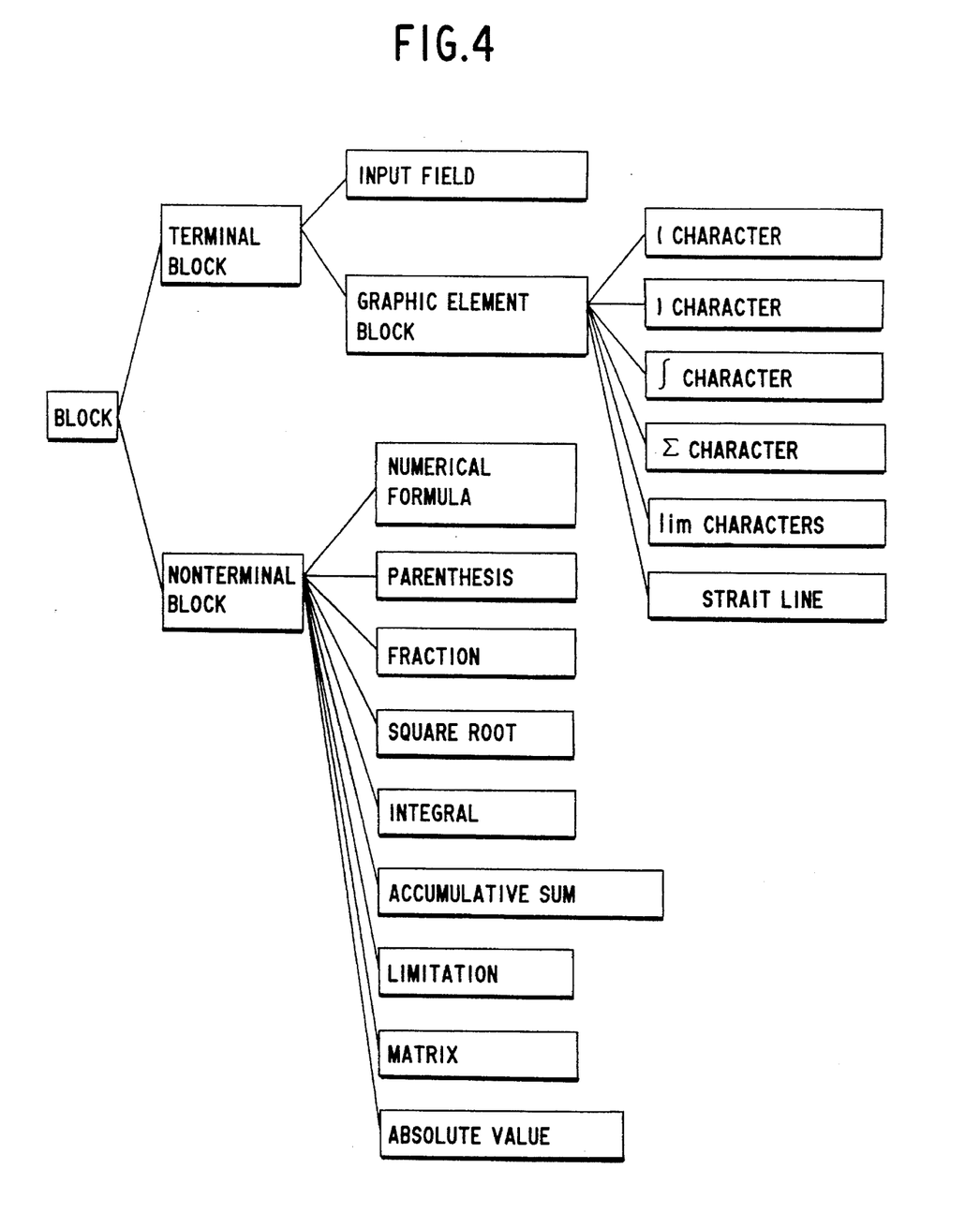
FIG. 4 is an example of block classes for inputting mathematical formulae

FIG. 4 shows an example of block classes for mathematical formula input. Hereinafter, the first child block of a nodule block will be referred to as a "subsequent block" of the nodule block and the child blocks after the second block will be referred to as "subblocks".

Blocks can be classified into both those which contain subblocks and those which do not and the former will be referred to as "nonterminal blocks" with the latter as "terminal blocks".

A terminal block is generally a block that retains a content to be displayed on the screen. If the syntax of a target document language contains a grammatical starting symbol, the nonterminal block class includes a starting block corresponding with the starting symbol. For mathematical formula input, numerical formula applies to this starting block.

In some cases, an attribute data block is further extended at the back of the block, for example, a block for storing inputted characters, a field of the number of inputted characters and a buffer for an inputted character string are provided. Hereinafter, the block having a buffer to store inputted characters will be referred to as an "input field", and this input field represents a block which can display a cursor on the screen and can accept an inputted code. The content of the work point memory always represents an active character position of any input field. A block holding graphic data to be displayed actually on the screen will be referred to as a "graphic element block". An input field and a graphic element block are terminal blocks. If the drawing rectangle of a terminal block is determined by only its layout format constraint disregarding its content, the terminal block will be referred to as a passive element block. For example, a straight line block, such as a straight line of a fraction, is a passive element block.

Furthermore, the construction means 102 that accepts a symbol code generates a subtree composed of a parent block and its child blocks regarding the notation of the symbol, and links the subtree to the editorial tree of a nodule list of the work memory 106. When the construction means accepts an instruction code designating the deletion of a symbol code, the construction means deletes the data collectively as a subtree of the nodule list from the work memory 106. In this manner, logical consistency with the data inputted at present is always ensured without any syntactic interpretation and reconstruction of the editorial tree.

Figure 5A:
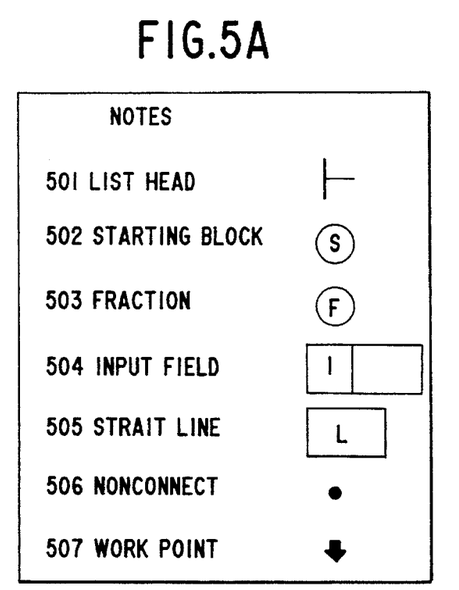
FIGS. 5A–5D are explanatory views showing the insertion of a fraction block.
Figure 5B:
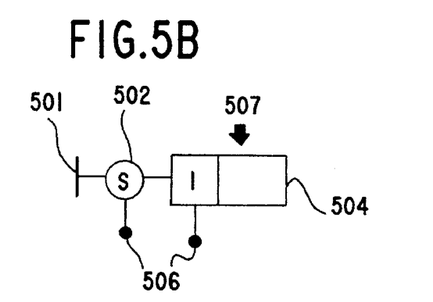
Figure 5C:
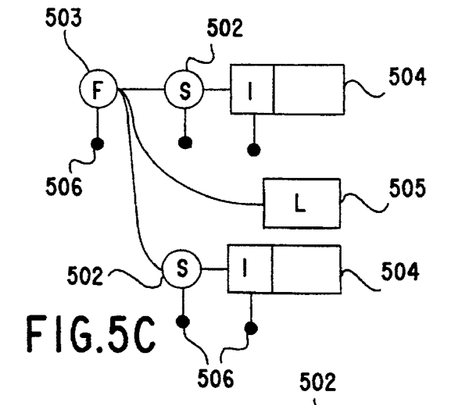
Figure 5D:
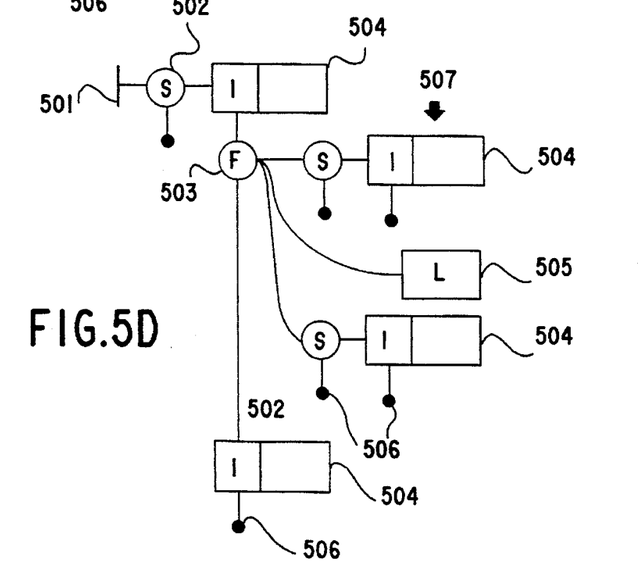

FIGS. 5A–D show an example of data operations when a fraction block is inserted into the nodule list. In the drawing, FIG. 5A is a chart showing functions of symbols, wherein reference numeral 501 designates a symbol which represents a list head; 502 is a symbol for a numerical formula block as a starting block S; 503 is a fraction block F; 504 is an input field I; 505 is a straight line block L; 506 is a non-connection symbol; and 507 is a work point symbol. FIG. 5B shows the nodule list of the initial state, FIG. 5C shows the fraction block and FIG. 5D shows the situation where the input field of the nodule list of the initial state shown in FIG. 5B is divided into two parts and the fraction block of FIG. 5C is collectively inserted as a subtree between them.

Figures 6A, 6B:
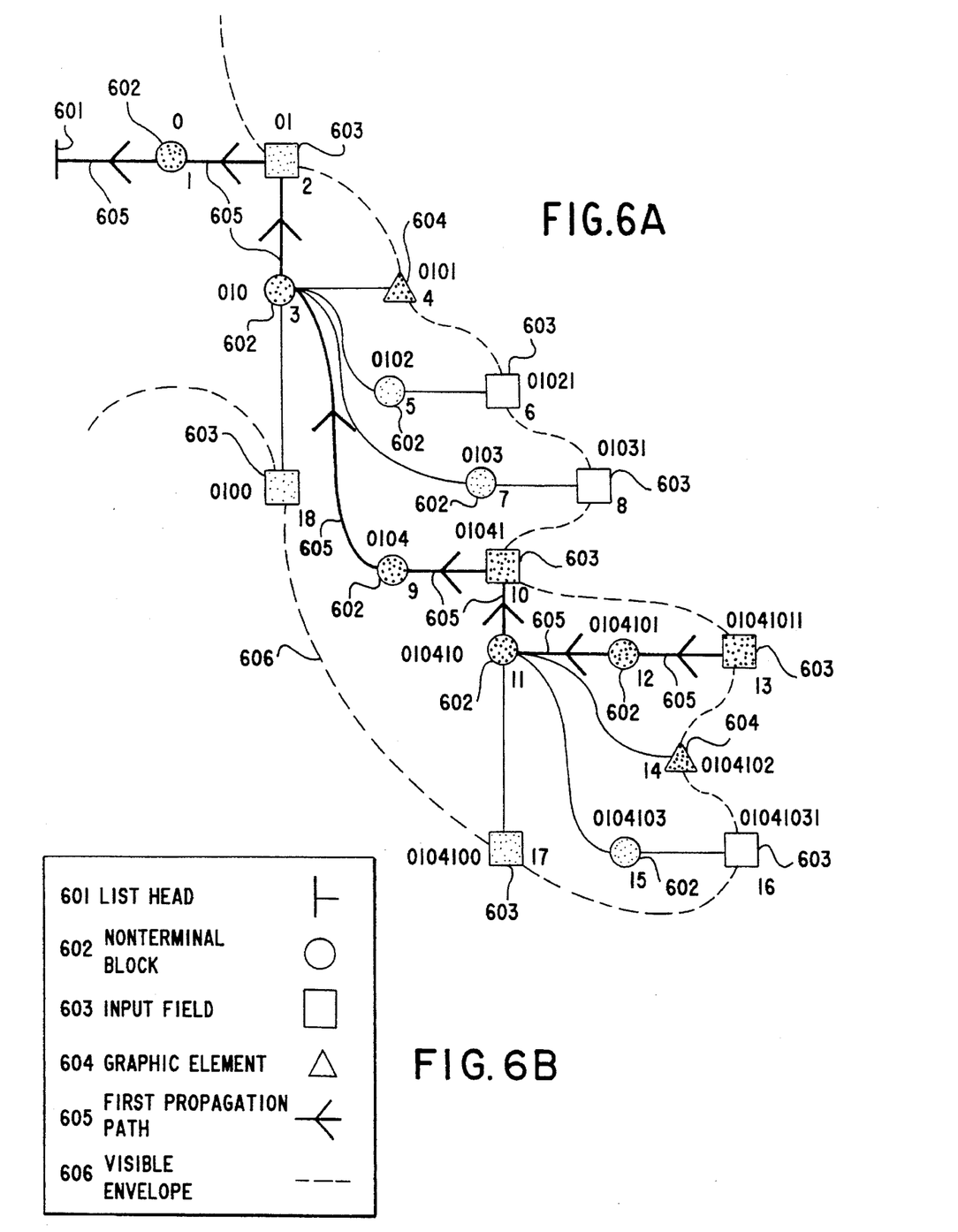
FIGS. 6A and 6B are explanatory views showing examples of updating of graphic rectangles.

The configuration means 103 executes very local calculations of the relative positions regarding the graphic rectangles to conform to the layout format constraint on the screen in propagation through the nodule list composed in the work memory 106 by the construction means 102, and stores the resultant configuration in the work memory 106. In more detail, the configuration means 103 first calculates the drawing rectangle of the block whose content is updated and turns ON the update switch. At that time, if the block has any subblocks, the drawing rectangle is determined generally depending on the sizes and the relative positions of the drawing rectangles of all the subblocks to conform to the layout format constraint. Furthermore, if the block has any child blocks, the relative rectangles and relative base lines of all the child blocks are determined with local calulations to conform to the layout format constraint. If the child block is a passive element block, the drawing rectangle of the child block is also determined under the constraint at the time. Then, the configuration means 103 stores the result in each field and turns ON the update switch of the child blocks. Next, traversing the nodule list in postorder to the parent block of the updated block, the configuration means executes the same processing up to the list head 601 shown in FIG. 6; this is the first propagation.

Next, the display rectangles, each of which represents an absolute block position, are determined by a simple computation traversing the nodule list in the order of the serial nodule numbers from the list head 601 as easy additions disposing the relative rectangle of each block to the absolute position of the parent block. When the display rectangle and the preceding display rectangle do not coincide, the update switch is turned ON. When the preceding display rectangle and the present display rectangle do coincide, suspending the inspection of the nodules ahead of that nodule the configuration means backtracks downward and proceeds to the next nodule. This is the second propagation which proceeds automatically and irrespectively of the contents of the editorial tree.

FIGS. 6A and 6B show an example of updating graphic rectangles at the propagation. In the drawing, FIG. 6B is a chart showing functions of symbols wherein reference numeral 601 is a list head, 602 is a nonterminal block, 603 is an input field and 604 is a graphic element block. FIG. 6A shows how changes are propagated. Serial nodule numbers 1, 2, , , 18 and allocation numbers 0–01041031 are allocated to each block. In the drawing, a modification at the input field 01041011 propagates through the first propagation path 605 downward to the list head 601; and the drawing rectangles of the blocks having a mark of ● or ■ are calculated, for the contents of those blocks might be changed; and the relative rectangles of the blocks having a mark of ○ or □ are calculated as related child blocks. The drawing rectangles of passive element blocks ▲ are also calculated at the time in this first propagation. All of the terminal blocks including input fields 603 and graphic element blocks 604 define the visible envelope 606 of the editorial tree; and the second propagation reflecting the first propagation on the list head 601 terminates thereupon and the configuration on the screen is determined therein.

The display means 104 reads out the nodule list stored by the configuration means 103, inspects the update switches traversing the nodule list in preorder from the list head 601, and if any block occurs whose update switch is ON, erases the display area on the screen occupied by the preceding display rectangle if the block is a terminal block, and copies the content of the display rectangle into the preceding display rectangle. If any block occurs whose update switch is turned OFF, suspending the inspection of the nodules ahead of that nodule the display means backtracks downward and proceeds to the next nodule.

Next, the display means 104 once again inspects the update switches traversing the nodule list in preorder from the list head 601, outputs the new display area on the screen if any terminal block whose update switch is ON exists, and turns off the update switch. If any block occurs whose update switch is turned OFF, suspending the inspection of the nodules ahead of that nodule the display means backtracks downward and proceeds to the next nodule.

The output means 105 converts the nodule list stored by both of the construction means 102 and the configuration means 103 and outputs them as the final output from the system or stores them in a long-term storage device.

A general procedure for converting a nodule list to an exchange data form is as follows. The contents of blocks are read out traversing the nodule list in the order of the serial nodule numbers from the list head, and the code strings are outputted sequentially. It is assumed that particular start symbol code sequences and end symbol code sequences are allocated to all of nonterminal blocks used. It is also assumed that the terminal blocks used are only graphic element blocks or input fields.

1) If the block is a graphic element block, it is discarded and the flow turns back.

2) If the block is an input field, the inputted characters are outputted in the number of inputted characters and the flow proceeds if any subsequent block occurs, and if not, the flow turns back.

3) If the block is a nonterminal block, its start symbol code sequence is outputted and all of its subblocks are visited so as to output their codes. Next, the end symbol code sequence of the nonterminal block is outputted. The flow proceeds if any subsequent block occurs, and if not, the flow turns back.

4) The flow stops when it returns to the list head.

As described above, the data input display system in accordance with the present invention does not need complicated procedures for input operations but can automatically decide the configuration on the screen. Therefore, the system of the present invention can always ensure the correct display as well as syntactic correctness of input documents, can designate a block area on the screen and can assist a user with operations such as deletion, insertion and duplication of the block area. Thus, the present invention provides a remarkable and effective capability of assisting an interface of inputting a structural data having layout format constraint of such a display as a mathematical formula or a chemical formula at the same level of ease as that of ordinary character strings.

I claim:

1. A data input display system for displaying text, symbols, and graphic data on a display screen and for editing data in a structural document having layout format constraint of constituent elements of mathematical formulae, chemical formulae, and other data of structure directed layout in the form of an editorial tree including a plurality of nodes wherein layout information is stored in each node without syntactic interpretation and reconstruction of said editorial tree, said data input display system comprising:

input means for inputting codes of a character, a digit, a symbol, an instruction code and serial strings of said codes;

construction means coupled to said input means for analyzing sequentially inputted codes and generating, deleting and memorizing said coded data collectively as a subtree of said editorial tree;

configuration means coupled to said construction means for calculating relative positions of said constituent elements in accordance with said layout information to conform to said layout format constraint of the editorial tree elements composed by said construction means, and for storing the resultant calculated layout information;

display means for reading out the layout information in the editorial tree stored by said construction means and configuration means, and selecting and displaying on said display screen only those graphic elements whose content and/or placement are changed in response to input; and output means for converting the editorial tree elements stored by both of said construction means and configuration means to serial code strings, and for outputting the resultant codes to final output devices.

2. The data input display system of claim 1 wherein:

said editorial tree has a hierarchical structure linking element nodes of a plurality of unit nodules with which a multibranch tree structure is constructed, said tree structure composed of said nodules being referred to as a nodule list; and wherein each said unit nodule has at most one parent nodule, a plurality of child nodules, an attribute data block to store attribute data and slots for storing pointers or values including a parent nodule slot to store a pointer to a parent nodule thereof, a parent branch number slot to store branch numbers of the parent nodule, a child branch count slot to store the count of child nodules thereof, an attribute data block slot to store a pointer to said attribute data block and child nodule slots to store pointers to the child nodules, and wherein upon receiving an inputted symbol code string said construction means generates a subtree composed of said nodules and links the subtree to said nodule list holding layout information in said attribute data block of each nodule, such that upon receiving an instruction code designating the deletion of a symbol code, said construction means deletes the symbol code as a subtree from the nodule list, and wherein said configuration means calculates relative positions regarding said layout information in said attribute data block of each nodule, to conform to said layout format constraint, and said calculation propagates to all of the leaves of the nodule list and determines the configuration to be displayed on the screen.

* * * * *

UNITED STATES PATENT AND TRADEMARK OFFICE
CERTIFICATE OF CORRECTION

PATENT NO. : 5,572,642
DATED : November 5, 1996
INVENTOR(S) : Nasu

It is certified that error appears in the above-indentified patent and that said Letters Patent is hereby corrected as shown below:

On the title page,
Item [57], line 8 please delete "synthetic" insert therefor --syntactic--.

Signed and Sealed this

First Day of July, 1997

Attest:

Attesting Officer

BRUCE LEHMAN

Commissioner of Patents and Trademarks